No. 875,966. PATENTED JAN. 7, 1908.
W. D. THOMAS.
EYEGLASS FRAME.
APPLICATION FILED NOV. 1, 1906.

Witnesses:
F. George Barry,
Henry Thieme.

Inventor:
William D. Thomas
by attorneys
Brown & Seward

UNITED STATES PATENT OFFICE.

WILLIAM D. THOMAS, OF NEW YORK, N. Y.

EYEGLASS-FRAME.

No. 875,966.      Specification of Letters Patent.      Patented Jan. 7, 1908.

Application filed November 1, 1906. Serial No. 341,521.

*To all whom it may concern:*

Be it known that I, WILLIAM D. THOMAS, a citizen of the United States, and resident of the borough of Brooklyn, in the city and State of New York, have invented a new and useful Improvement in Eyeglass-Frames, of which the following is a specification.

My invention relates to eye-glass frames with the object in view of providing a nose pad adjustable laterally and also adjustable to different positions along its support to accommodate noses of various shapes and sizes and, at the same time, to form a stable support for the pads.

Figure 1:
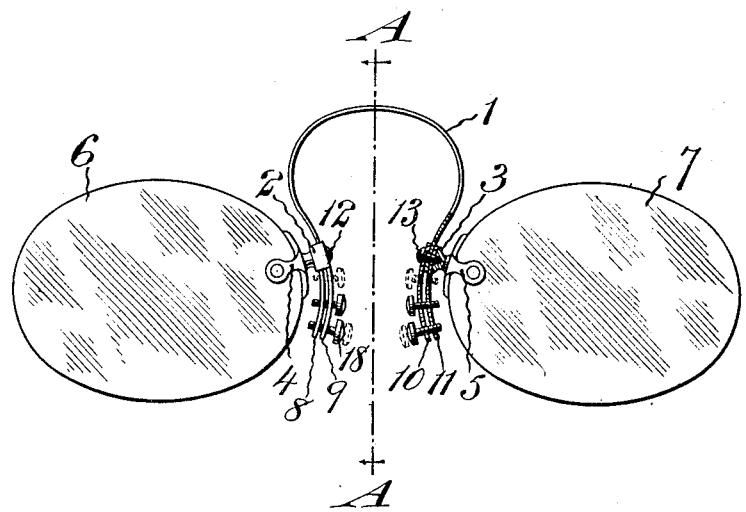
Figure 2:
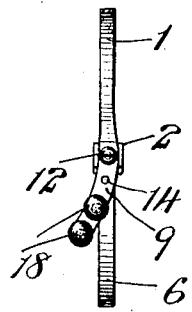
Figure 3:
Figure 4:

In the accompanying drawings, Figure 1 is a view of a pair of eye-glasses in elevation showing the parts in the position which they assume when ready for use, Fig. 2 is a transverse section in the plane of the line A—A of Fig. 1, Fig. 3 is a view in detail of one of the pad supports, and Fig. 4 is a view in detail of one of the pads.

The bow is denoted by 1. It may be of any suitable conformation and, in the present instance, is shown attached at its opposite ends to sockets 2 and 3 in the ends of the posts 4 and 5 to which the glasses 6 and 7 are secured.

For the purpose of giving the pad an extended support, I prefer to lock each end of the bow between the upper ends of two curved strips those seated in the socket 2 being denoted by 8 and 9 and those having their upper ends seated in the socket 3 by 10 and 11. These supporting pieces 8, 9, and 10, 11, are spaced apart, the thickness of the ends of the bow 1 and are securely clamped to the posts 4 and 5 by means of screws 12 and 13. These supporting pieces extend downwardly and curve away from the plane of the glasses, as clearly shown in Fig. 2, and are provided with a plurality of perforations, in the present instance three, denoted by 14, 15 and 16, for the reception of the shank of the nose pad.

The nose pad has a screw threaded stem 17 projecting from its head 18 and perforations 14, 15, 16, are screw threaded to register with the screw threaded shank 17 of the pad. The number of these pads for each side of the nose may be one or more, in the present instance two being shown for each side of the nose. These pads may be adjusted by turning them in or out in their threaded supports to suit the contour of the side of the nose or they may be adjusted further up toward the posts 2 and 3 or further away from the posts, thus providing for not only an independent adjustment toward and away from the side of the nose but an independent adjustment along the surface of the nose. This arrangement provides for a very accurate adjustment of the glasses to the nose, providing for pressure just where the pressure is most needed for retaining the glasses securely in position and relieving the pressure where it is not required.

It is obvious that changes might be resorted to in the form and arrangement of the several parts without departing from the spirit and scope of my invention; hence I do not wish to limit myself strictly to the structure herein shown and described, but

What I claim is:—

1. The combination with an eye-glass frame, of pad supports depending from the posts of the frame and each having a plurality of screw threaded perforations and nose pads provided with threaded stems for engagement with the perforations of said depending supports at intervals along said supports whereby the pads may be adjusted bodily toward and away from the surface of the nose and also in different positions along the surface of the nose.

2. The combination with an eye-glass frame provided with bifurcated supports, of nose pads adjustably seated in the branches of the bifurcated supports.

3. The combination with an eye-glass frame provided with bifurcated supports, of nose pads provided with stems, the said stems having a screw threaded engagement with the branches of the bifurcated supports.

In testimony, that I claim the foregoing as my invention, I have signed my name in presence of two witnesses, this 31st day of October 1906.

WILLIAM D. THOMAS.

Witnesses:
    F. GEORGE BARRY,
    HENRY THIEME.